(12) United States Patent
Guo

(10) Patent No.: US 12,275,337 B2
(45) Date of Patent: Apr. 15, 2025

(54) CHILD SAFETY SEAT

(71) Applicant: Wonderland Switzerland AG, Steinhausen (CH)

(72) Inventor: Zheng-Wen Guo, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 18/589,683

(22) Filed: Feb. 28, 2024

(65) Prior Publication Data

US 2024/0198869 A1 Jun. 20, 2024

Related U.S. Application Data

(63) Continuation of application No. 17/520,703, filed on Nov. 7, 2021, now Pat. No. 11,945,345, which is a continuation of application No. 16/931,131, filed on Jul. 16, 2020, now Pat. No. 11,198,380.

(30) Foreign Application Priority Data

Jul. 18, 2019 (CN) .......................... 201910650374.0

(51) Int. Cl.
*B60N 2/28* (2006.01)

(52) U.S. Cl.
CPC ......... *B60N 2/2884* (2013.01); *B60N 2/2821* (2013.01); *B60N 2/2872* (2013.01); *B60N 2/2893* (2013.01)

(58) Field of Classification Search
CPC .. B60N 2/2884; B60N 2/2872; B60N 2/2821; B60N 2/2893
See application file for complete search history.

(56) References Cited

U.S. PATENT DOCUMENTS

2018/0244178 A1* 8/2018 Pos ...................... B60N 2/2884

FOREIGN PATENT DOCUMENTS

CN 207360133 U * 5/2018 ........... B60N 2/2872

* cited by examiner

*Primary Examiner* — Anthony D Barfield
(74) *Attorney, Agent, or Firm* — NZ Carr Law Office

(57) ABSTRACT

A child safety seat includes a seat shell having a sidewall for restricting a sideways movement of a child sitting on the seat shell, the sidewall being provided with a locking slot, a buffering part movably connected with the seat shell, and a latching mechanism including a latch carried with the buffering part. The buffering part is movable between a stowed position where the buffering part is retracted toward the sidewall, and a deployed position where the buffering part protrudes sideways from the sidewall. The latch is movable relative to the buffering part between a locking state where the latch is engaged with the locking slot for locking the buffering part to the seat shell, and an unlocking state where the latch is disengaged from the locking slot for unlocking the buffering part so that the buffering part is movable relative to the seat shell.

22 Claims, 14 Drawing Sheets

CHILD SAFETY SEAT

CROSS-REFERENCE TO RELATED APPLICATION(S)

This application is a continuation application of U.S. patent application Ser. No. 17/520,703 filed on Nov. 7, 2021, now U.S. Pat. No. 11,945,345, which is a continuation of U.S. patent application Ser. No. 16/931,131 filed on Jul. 16, 2020, now U.S. Pat. No. 11,198,380, which claims priority to Chinese patent application no. 201910650374.0 filed on Jul. 18, 2019.

BACKGROUND

1. Field of the Invention

The present invention relates to child safety seats.

2. Description of the Related Art

A child safety seat is typically used in an automobile vehicle to restrain a child in the event of accidental collision. In particular, the child safety seat can provide protection by restraining the child from moving forward or rearward when the vehicle is subjected to frontal or rear collision.

In addition to providing protection during frontal and rear collision, some child safety seat may further include a side impact protection structure adapted to dissipate crash energy induced by vehicle side collision. The side impact protecting structure is generally provided on a sidewall of the child safety seat, and includes a protecting element rotatable to retract for storage or deploy for use. When the protecting element is in the retracted position, a locking mechanism may be provided to lock the protecting element in position. In order to use the protecting element, a button has to be operated to unlock the protecting element, which then can be deployed thanks to the biasing force of a spring. Unfortunately, this conventional construction is relatively complex and may not be convenient to operate in practice.

Therefore, there is a need for an improved child safety seat having a side impact protection mechanism that is simple in construction, easy to operate, and address at least the foregoing issues.

SUMMARY

The present application describes a child safety seat having a side impact protection mechanism that is adapted to provide protection during vehicle side collision and can be stowed for compact storage and deployed in a convenient manner.

According to an embodiment, the child safety seat includes a seat shell having a sidewall for restricting a sideways movement of a child sitting on the seat shell, the sidewall being provided with a locking slot, a buffering part movably connected with the seat shell, and a latching mechanism including a latch carried with the buffering part. The buffering part is movable between a stowed position where the buffering part is retracted toward the sidewall, and a deployed position where the buffering part protrudes sideways from the sidewall. The latch is movable relative to the buffering part between a locking state where the latch is engaged with the locking slot for locking the buffering part to the seat shell, and an unlocking state where the latch is disengaged from the locking slot for unlocking the buffering part so that the buffering part is movable relative to the seat shell.

According to another embodiment, the child safety seat includes a seat shell having a sidewall for restricting a sideways movement of a child sitting on the seat shell, the sidewall having an opening and a mount base disposed inside the opening, a buffering part pivotally connected with the mount base, a latching mechanism including a latch carried with the buffering part. The buffering part is rotatable between a stowed position where the buffering part is retracted toward the sidewall, and a deployed position where the buffering part protrudes sideways from the sidewall. The latch is movable relative to the buffering part between a locking state for locking the buffering part to the seat shell, and an unlocking state for unlocking the buffering part so that the buffering part is rotatable relative to the seat shell.

According to yet another embodiment, the present application describes a side impact protection mechanism for a child safety seat, which includes a buffering part pivotally connected with a seat shell of the child safety seat, and a latch carried with the buffering part and having an end adapted to engage with a locking slot provided on the seat shell, wherein the latch is movable relative to the buffering part to engage with the locking slot for locking the buffering part to the seat shell and disengage from the locking slot for rotation of the buffering part relative to the seat shell.

DETAILED DESCRIPTION OF THE EMBODIMENTS

Figure 1:
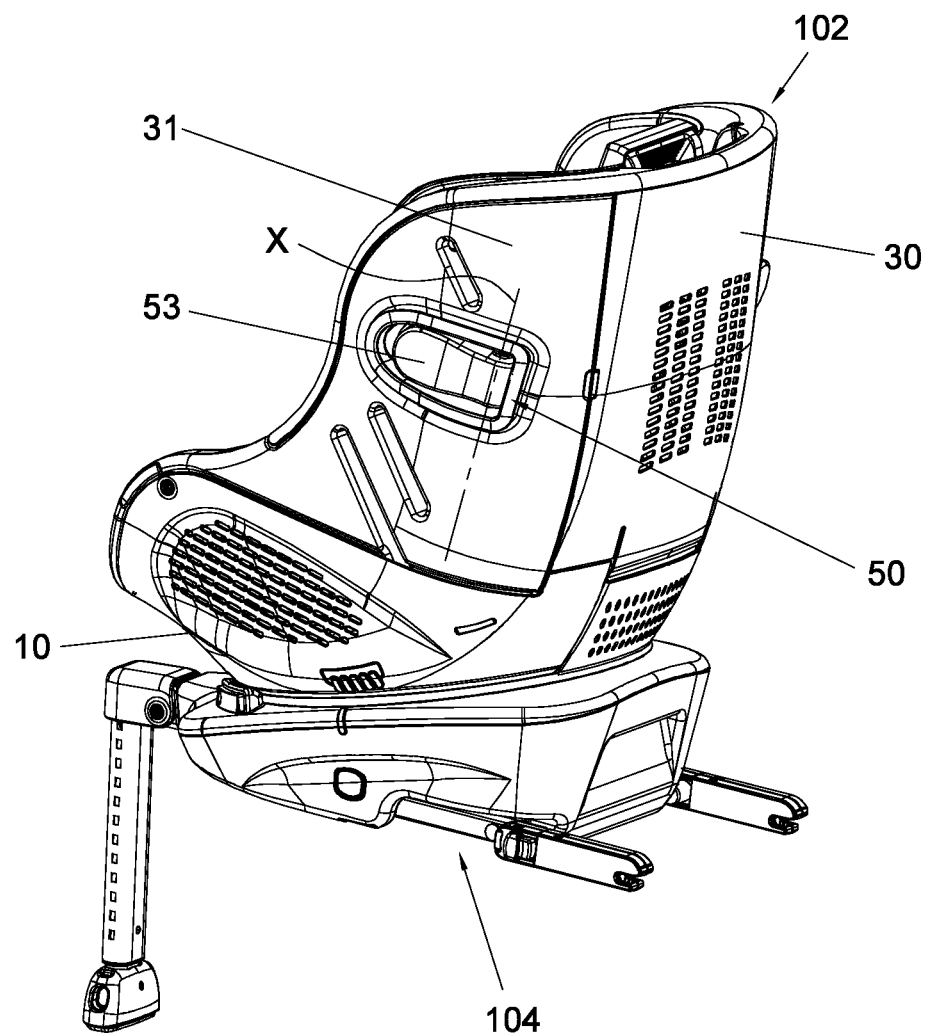
FIG. 1 is a perspective view illustrating an embodiment of a child safety seat having a side impact protection mechanism in a stowed position.
Figure 2:
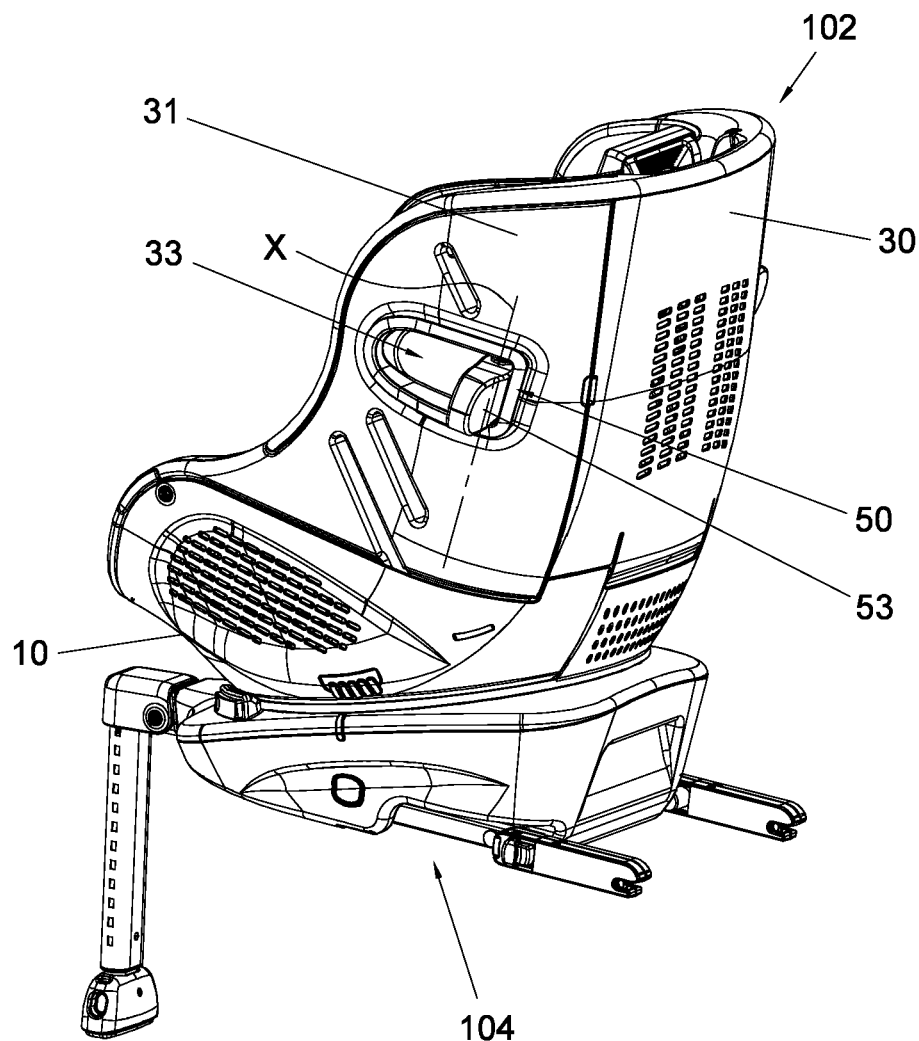
FIG. 2 is a perspective view illustrating the child safety seat with the side impact protection mechanism in a deployed position.
Figure 3:
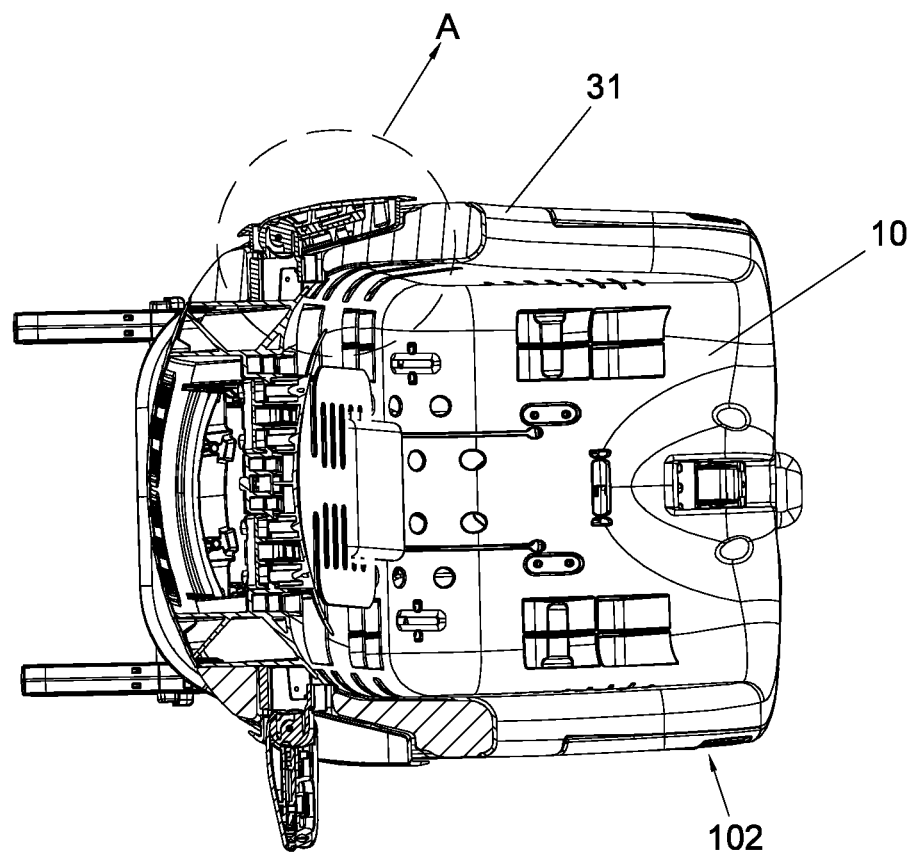
FIG. 3 is a partial cross-sectional view of the child safety seat with one side impact protection mechanism in the stowed position.

FIGS. 1 and 2 are two perspective views illustrating an embodiment of a child safety seat 100. Referring to FIGS. 1 and 2, the child safety seat 100 can include a seat shell 102, a support base 104 provided at a bottom of the seat shell 102 for supporting the seat shell 102, and two side impact protection mechanisms 50 respectively coupled to the seat shell 102 at a left and a right side thereof. The seat shell 102 can have a seat portion and a backrest portion 30 fixedly connected with each other. For example, the seat 10 shell 102 may be integrally formed to include the seat portion 10 and the backrest portion 30. The seat shell 102 can further include two sidewalls 31 respectively provided at a left and a right side of the seat shell 102. The two sidewalls 31 can be fixedly connected with the backrest portion 30, respectively project forward from the backrest portion 30 at the left and right sides of the seat shell 102, and extend from a top of the backrest portion 30 toward the seat portion 10. The two sidewalls 31 can restrict sideways movements of a child sitting on the seat shell 102 between the two sidewalls 31.

Referring to FIGS. 1 and 2, the two side impact protection mechanisms 50 at the left and right sides of the seat shell 102 can have a same construction, and can be respectively disposed at symmetric positions on the two sidewalls 31 of the backrest portion 30. More specifically, each sidewall 31 can have an opening 33 provided at an outer side thereof for receiving the assembly of the corresponding side impact protection mechanism 50. In conjunction with FIGS. 1 and 2, FIGS. 3-6 are cross-sectional views illustrating one side impact protection mechanism 50 assembled with the seat shell 102, and FIGS. 7-14 are various views illustrating various construction details for the side impact protection mechanism 50. Referring to FIGS. 3-14, the side impact protection mechanism 50 can include a buffering part 53 and a spring 57.

The buffering part 53 is movably connected with the seat shell 102, and may have any suitable construction adapted to provide cushioning effects. According to an example of construction, the buffering part 53 may include multiple casing portions that are fixedly attached to one another. Examples of suitable materials for making the buffering part 53 may include, without limitation, plastics. The buffering part 53 is movable relative to the seat shell 102 at the outer side of the sidewall 31. For example, the buffering part 53 can move between a stowed position shown in FIG. 1 and a deployed position shown in FIG. 2. In the stowed position, the buffering part 53 may be retracted toward the sidewall 31 and substantially received inside the opening 33 for compact storage. In the deployed position, the buffering part 53 may protrude outward and sideways from the sidewall 31, e.g., substantially perpendicular to the sidewall 31. During sideways collision, the buffering part 53 in the deployed position may be pressed against a vehicle body (e.g., a vehicle door panel) and consequently deform, crush and/or cause a portion of the seat shell 102 around the buffering part 53 to deform for dissipating a portion of the impact energy.

According to an example of construction, the buffering part 53 may be pivotally connected with the seat shell 102. For example, a mount base 51 can be fixedly connected with the sidewall 31 of the seat shell 102, and the buffering part 53 can be pivotally connected with the mount base 51. The buffering part 53 can thus rotate relative to the seat shell 102 between the stowed position and the deployed position. The pivot axis X about which the buffering part 53 rotates relative to the seat shell 102 may extend generally along a longitudinal direction of the backrest portion 30.

Referring to FIGS. 7-14, the mount base 51 can include one or more flange 513 for facilitating the attachment of the mount base 51 to the seat shell 102. For example, the mount base 51 can be placed in the opening 33 of the sidewall 31, and a fastener may be engaged through the flange 513 with the seat shell 102 for fixedly attaching the mount base 51 to the seat shell 102. Moreover, the mount base 51 can include a pivot support portion 511 having a hole 5113 (better shown in FIG. 9). The mount base 51 including the flange 513 and the pivot support portion 511 may be formed integrally as a single part. The pivot support portion 511 may exemplarily have a generally cylindrical shape. A pivot axle 52 may be assembled through the hole 5113 of the pivot support portion 511 and a hole 537 provided on the buffering part 53 for pivotally connecting the buffering part 53 with the pivot support portion 511 of the mount base 51. For example, the hole 537 may be exemplarily formed through two sidewalls 532 of the buffering part 53 that face each other across a cavity 535, the buffering part 53 may be mounted to the mount base 51 with the pivot support portion 511 at least partially received in the cavity 535 of the buffering part 53, and the pivot axle 52 can be assembled through the sidewalls 532 and the pivot support portion 511 inside the cavity 535.

Figure 10:
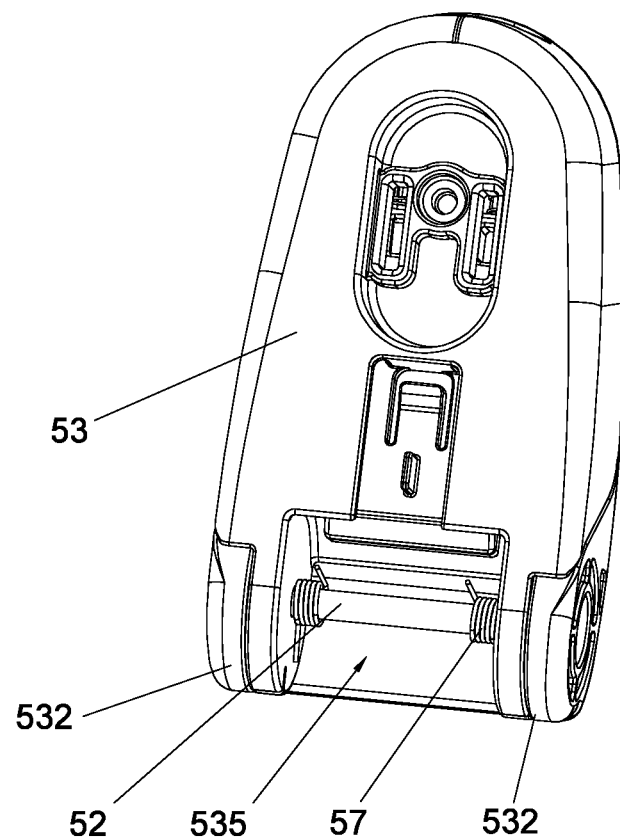
FIG. 10 is a perspective view illustrating some construction details of the side impact protection mechanism.
Figure 11:
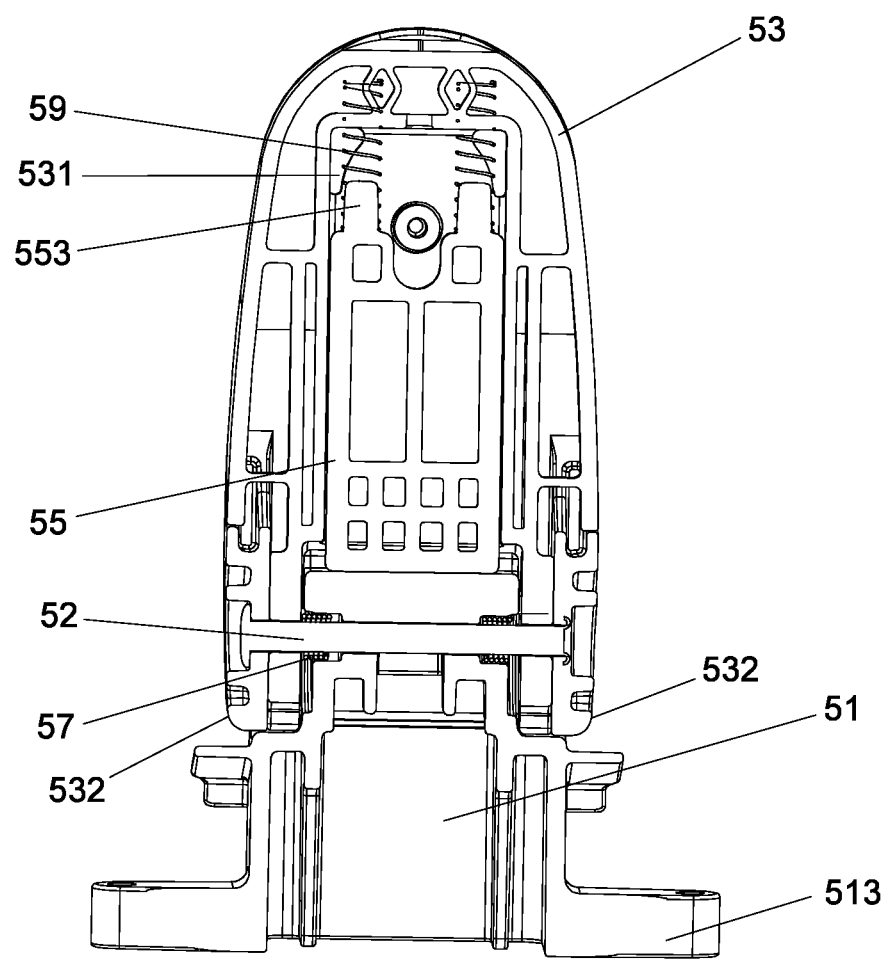
FIG. 11 is a cross-sectional view of the side impact protection mechanism.
Figure 14:
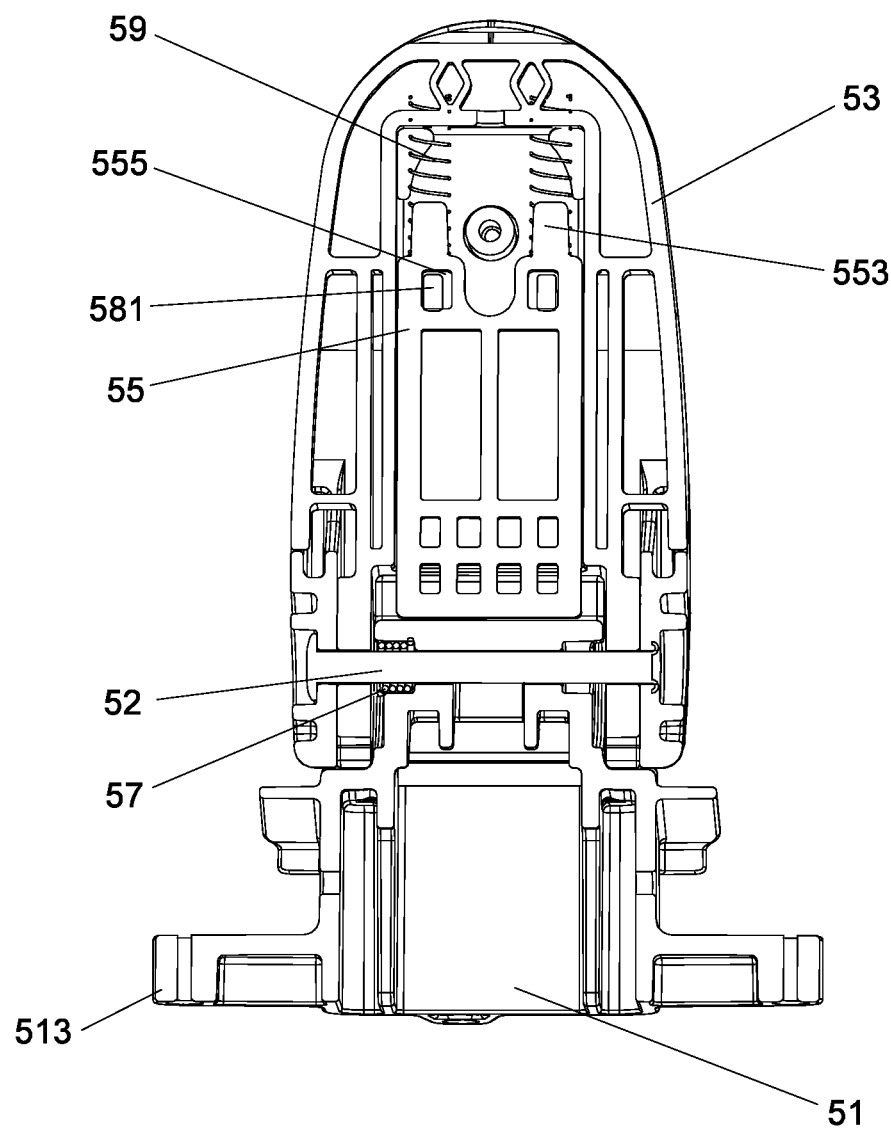
FIG. 14 is another cross-sectional view of the side impact protection mechanism shown in FIG. 12.

Referring to FIGS. 10, 11 and 14, the spring 57 can apply a biasing force on the buffering part 53 for facilitating the movement of the buffering part 53 toward the stowed position. According to an example of construction, the spring 57 may be a torsion spring disposed around the pivot axle 52, and may be respectively connected with the mount base 51 and the buffering part 53. The spring 57 can thereby bias the buffering part 53 toward the stowed position.

Referring to FIGS. 4 and 6-11, the side impact protection mechanism 50 can further include a latching mechanism for locking the buffering part 53 in the deployed position. This latching mechanism can include a latch 55 and one or more spring 59.

The latch 55 can be carried with the buffering part 53, and can move between a locking state where the latch 55 is engaged with the mount base 51 (better shown in FIG. 6) for locking the buffering part 53 in the deployed position, and an unlocking state where the latch 55 is disengaged from the mount base 51 (better shown in FIG. 4) for unlocking the buffering part 53 so that the buffering part 53 can rotate relative to the seat shell 102. According to an example of construction, the latch 55 can be slidably connected with the buffering part 53, and can slide to engage with or disengage from a locking slot 5111 provided on the pivot support portion 511, wherein the latch 55 is engaged with the locking slot 5111 in the locking state and disengaged from the locking slot 5111 in the unlocking state. For example, the latch 55 can be received at least partially in a hollow interior 531 of the buffering part 53, and can slide relative to the buffering part 53 to protrude outside the hollow interior 531 for engaging with the locking slot 5111 or to retract toward the hollow interior 531 for disengaging from the locking slot 5111. The latch 55 may slide along an axis that is substantially orthogonal to the axis defined by the pivot axle 52.

The spring 59 can bias the latch 55 toward the locking state. According to an example of construction, the spring 59 can be disposed in the hollow interior 531 and have two opposite ends respectively connected with the latch 55 and an inner sidewall of the hollow interior 531 in the buffering part 53. For facilitating the connection of the spring 59 with the latch 55, the latch 55 can have protrusion 553 to which is anchored the spring 59. In the illustrated embodiment, two springs 59 are provided to bias the latch 55 toward the locking state. It will be appreciated, however, that the spring 59 may be provided in any suitable number.

The latching mechanism provided in the buffering part 53 may include a structure that allows easy unlocking of the buffering part 53 by directly operating the buffering part 53.

Figure 4:
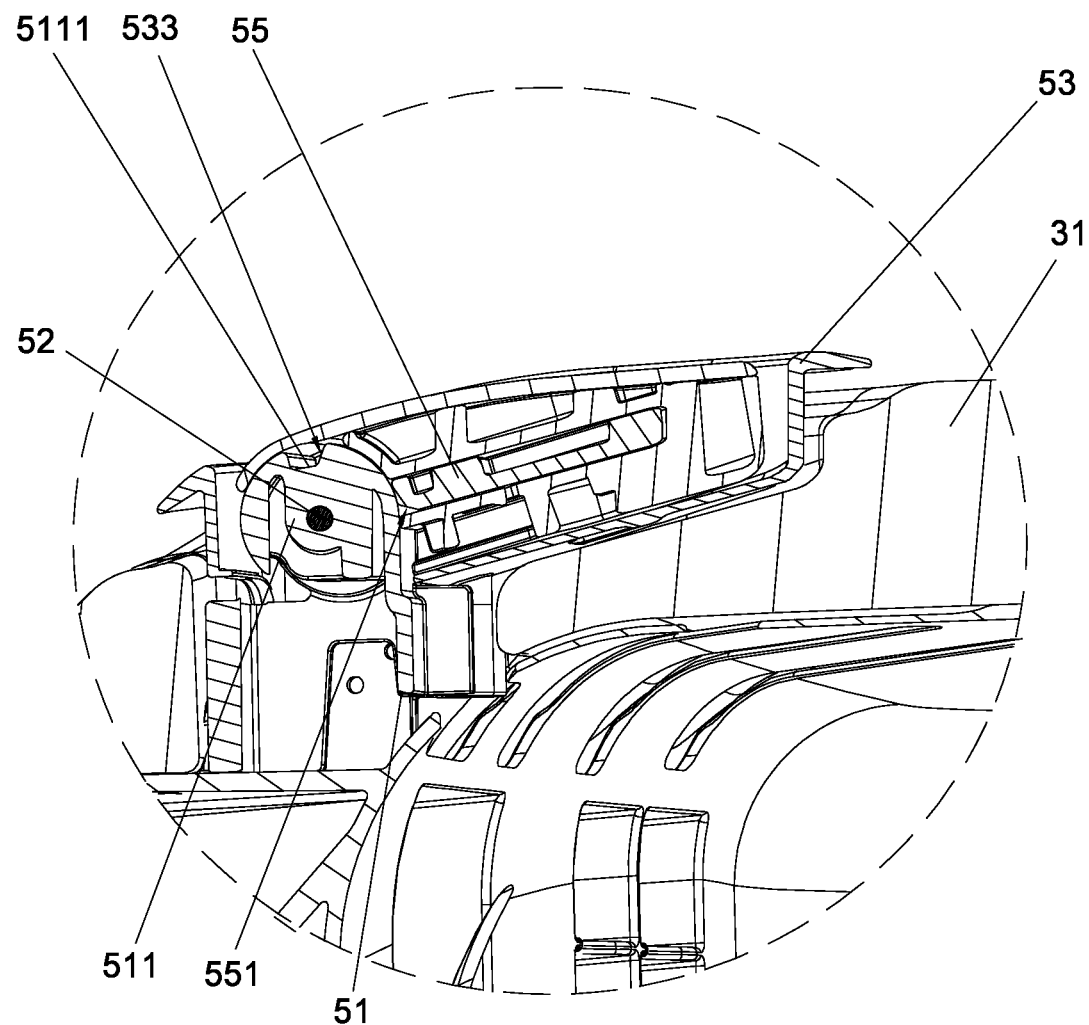
FIG. 4 is an enlarged view of portion A shown in FIG. 3.
Figure 5:
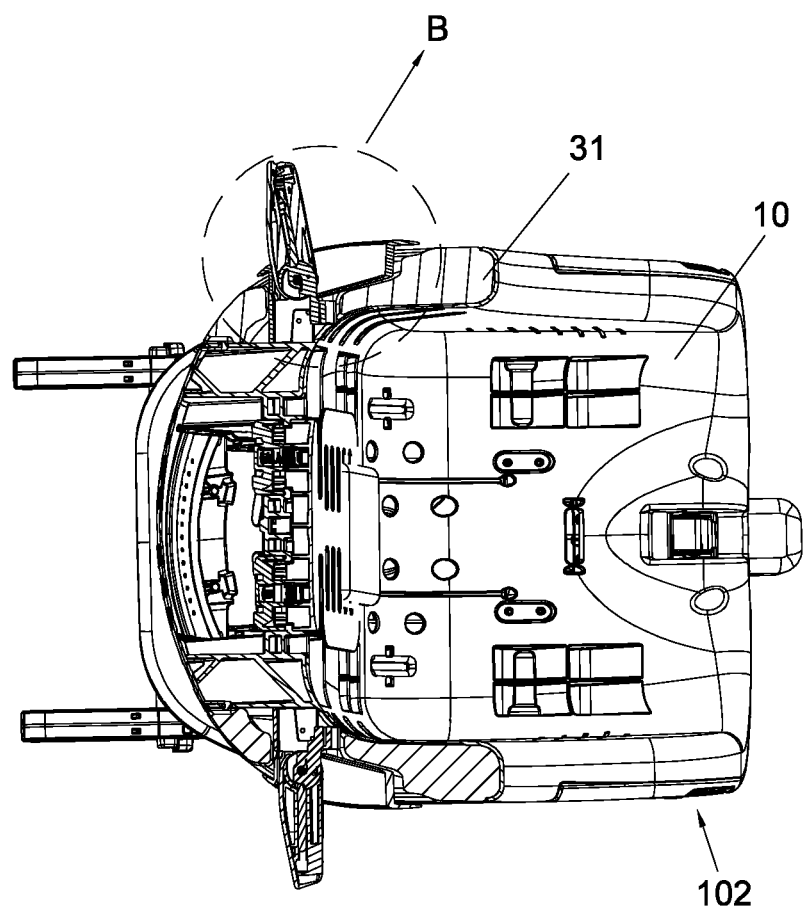
FIG. 5 is a partial cross-sectional view of the child safety seat with the side impact protection mechanism in the deployed position.
Figure 6:
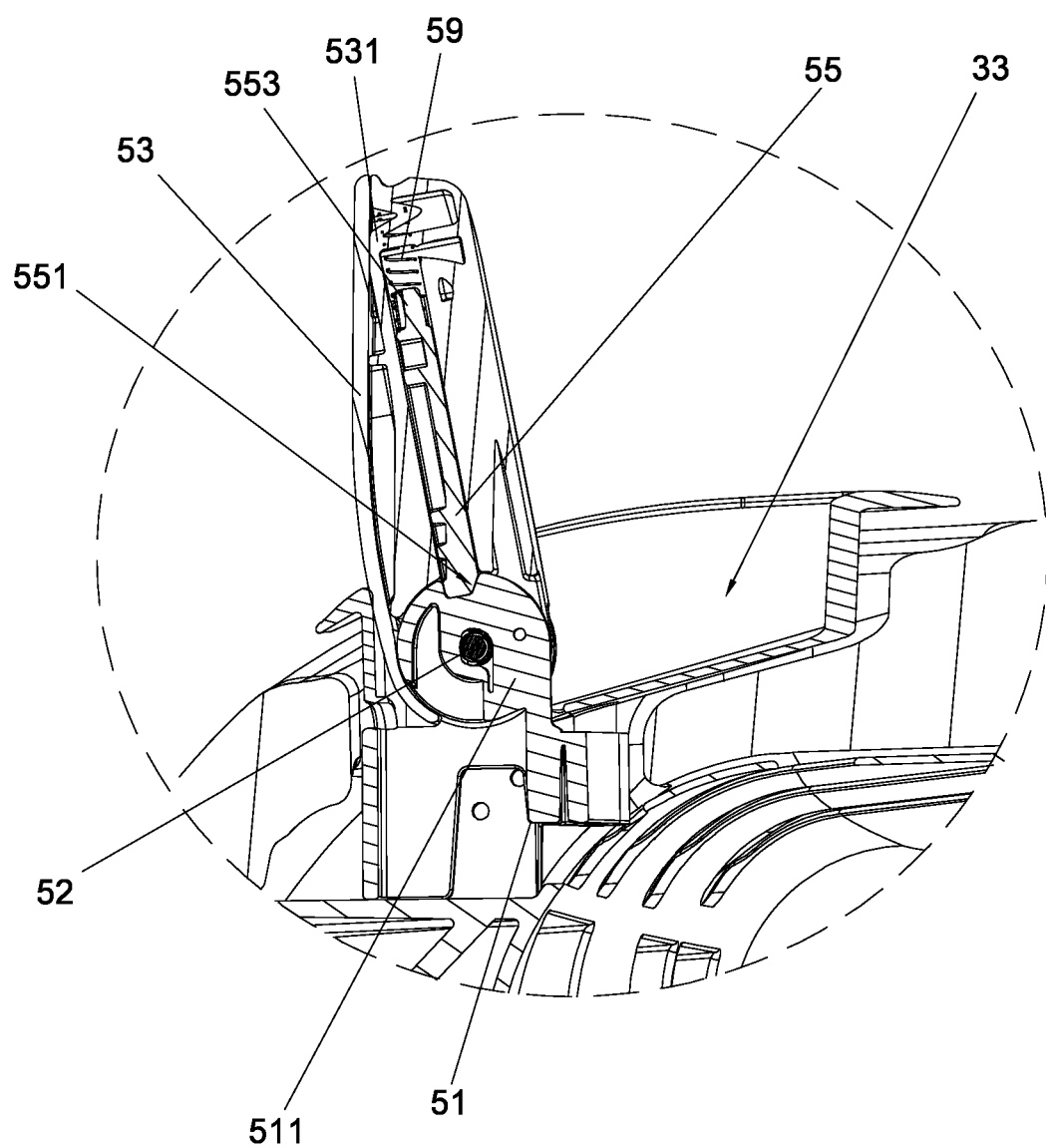
FIG. 6 is an enlarged view of portion B shown in FIG. 5.
Figure 7:
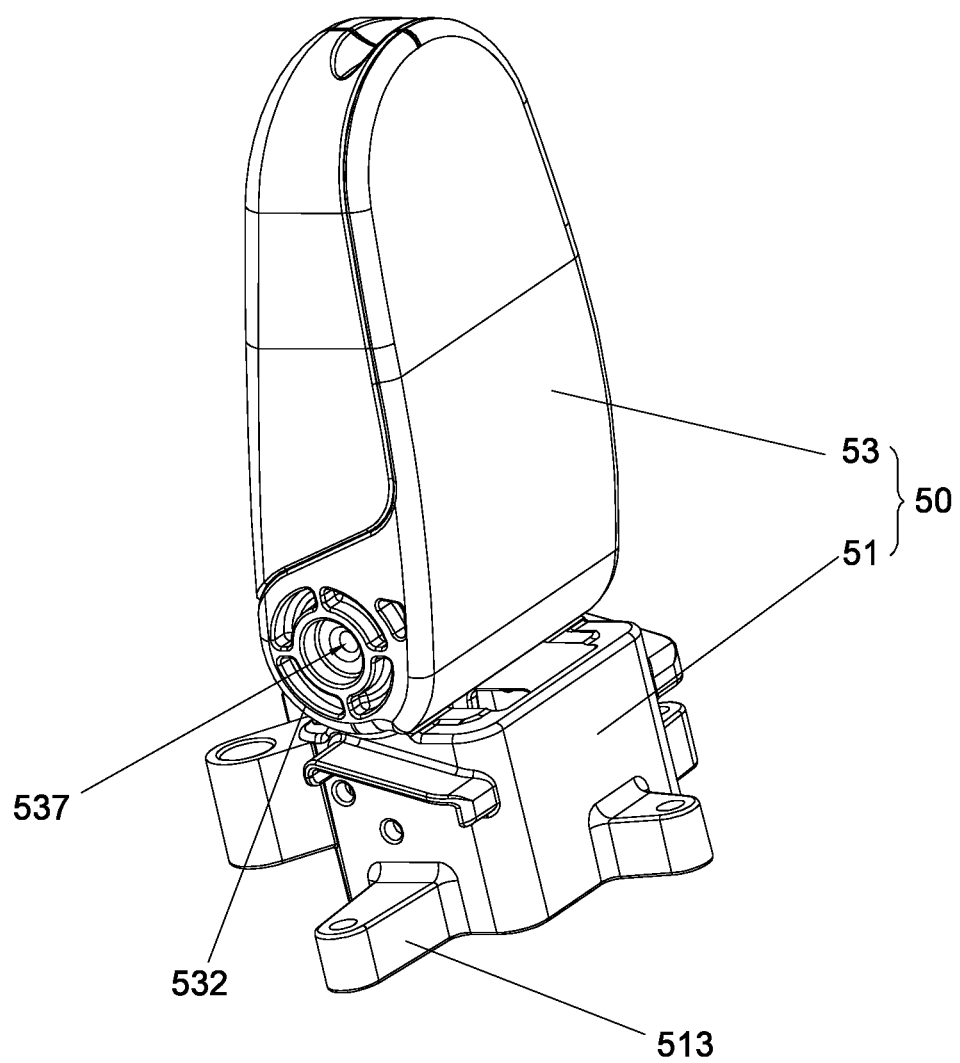
FIG. 7 is a perspective view illustrating the side impact protection mechanism alone in the deployed position.
Figure 8:
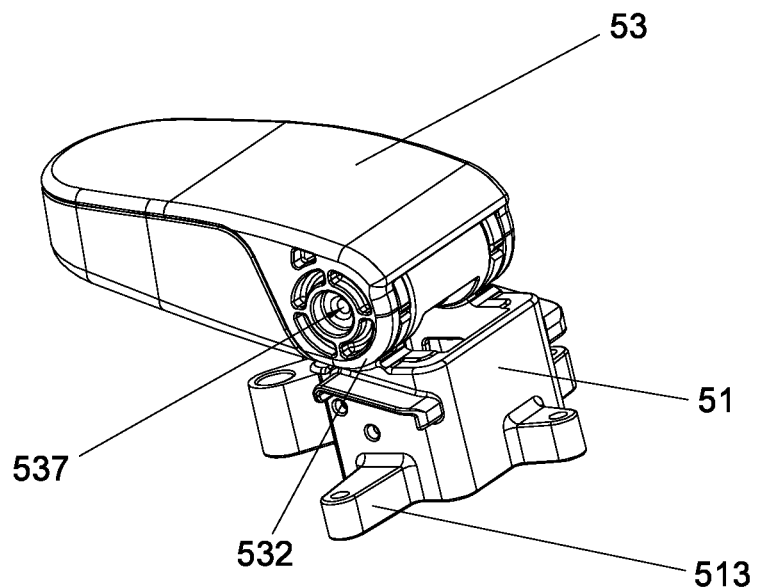
FIG. 8 is a perspective view illustrating the side impact protection mechanism alone in the stowed position.
Figure 9:
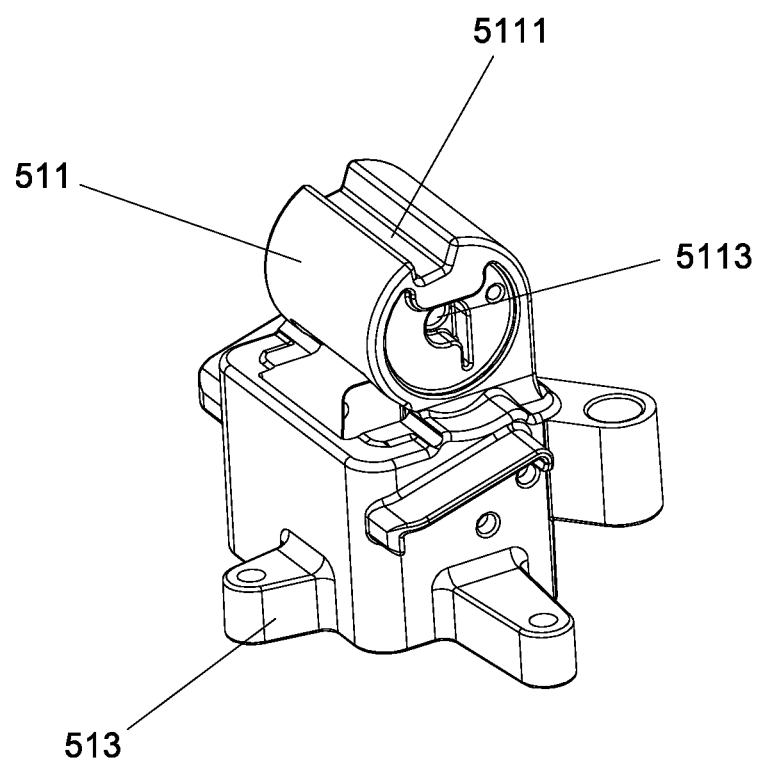
FIG. 9 is a perspective view illustrating a mount base used for assembling the side impact protection mechanism with a seat shell of the child safety seat.

Referring to FIGS. 4 and 6, when the buffering part 53 is locked in the deployed position with the latch 55 engaged with the locking slot 5111, the engaged end of the latch 55 can have a bevel 551 that lies adjacent to a bevel 533 provided in the locking slot 5111. For stowing the buffering part 53, a caregiver can directly rotate the buffering part 53 from the deployed position toward the stowed position, which causes a sliding contact between the bevels 551 and 533 that urges the latch 55 to disengage from the locking slot 5111 and thereby unlocks the buffering part 53. The biasing force of the spring 57 then can urge the unlocked buffering part 53 to rotate to the stowed position.

Figure 12:
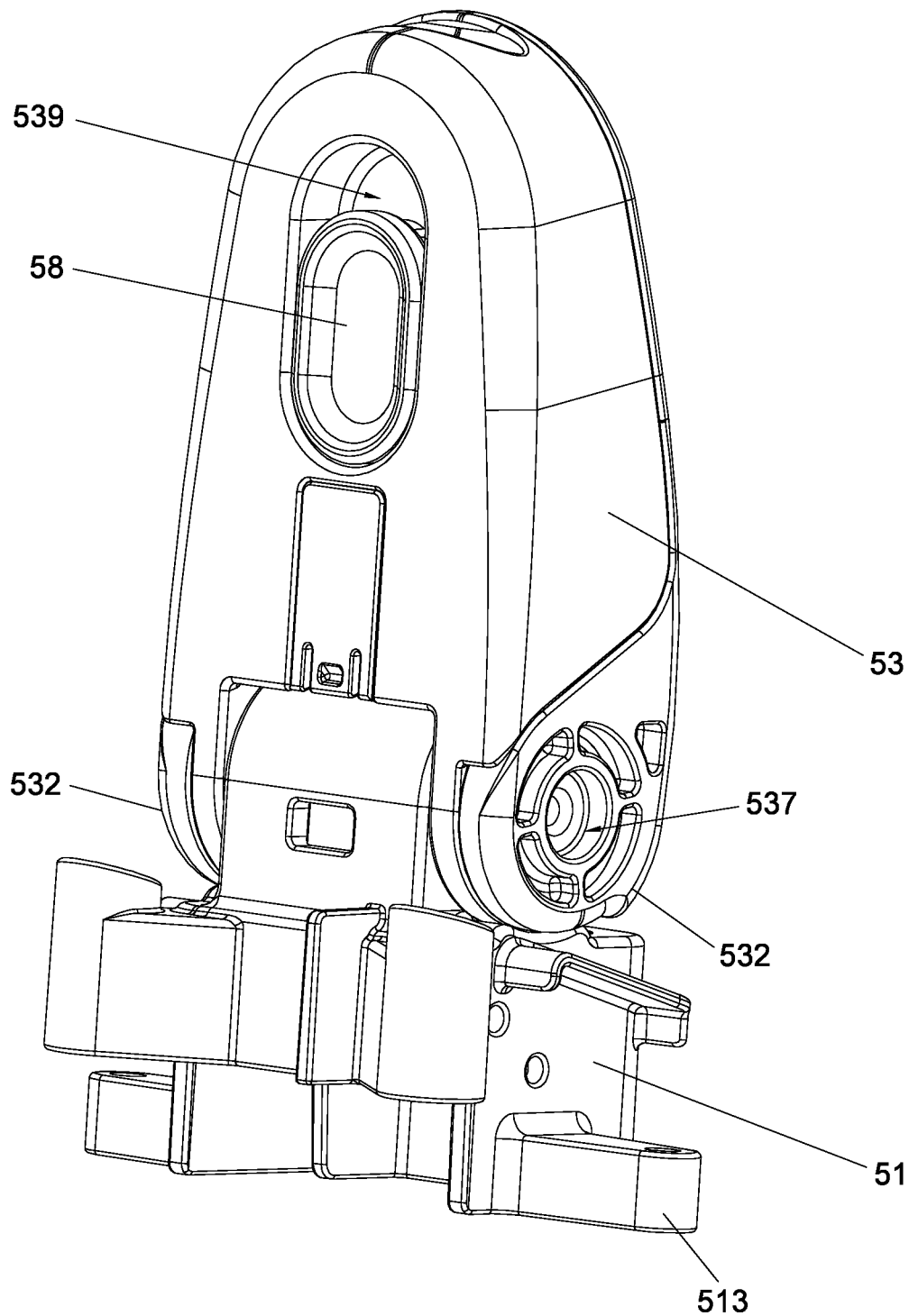
FIG. 12 is a perspective view illustrating a variant construction of the side impact protection mechanism including a release actuator.
Figure 13:
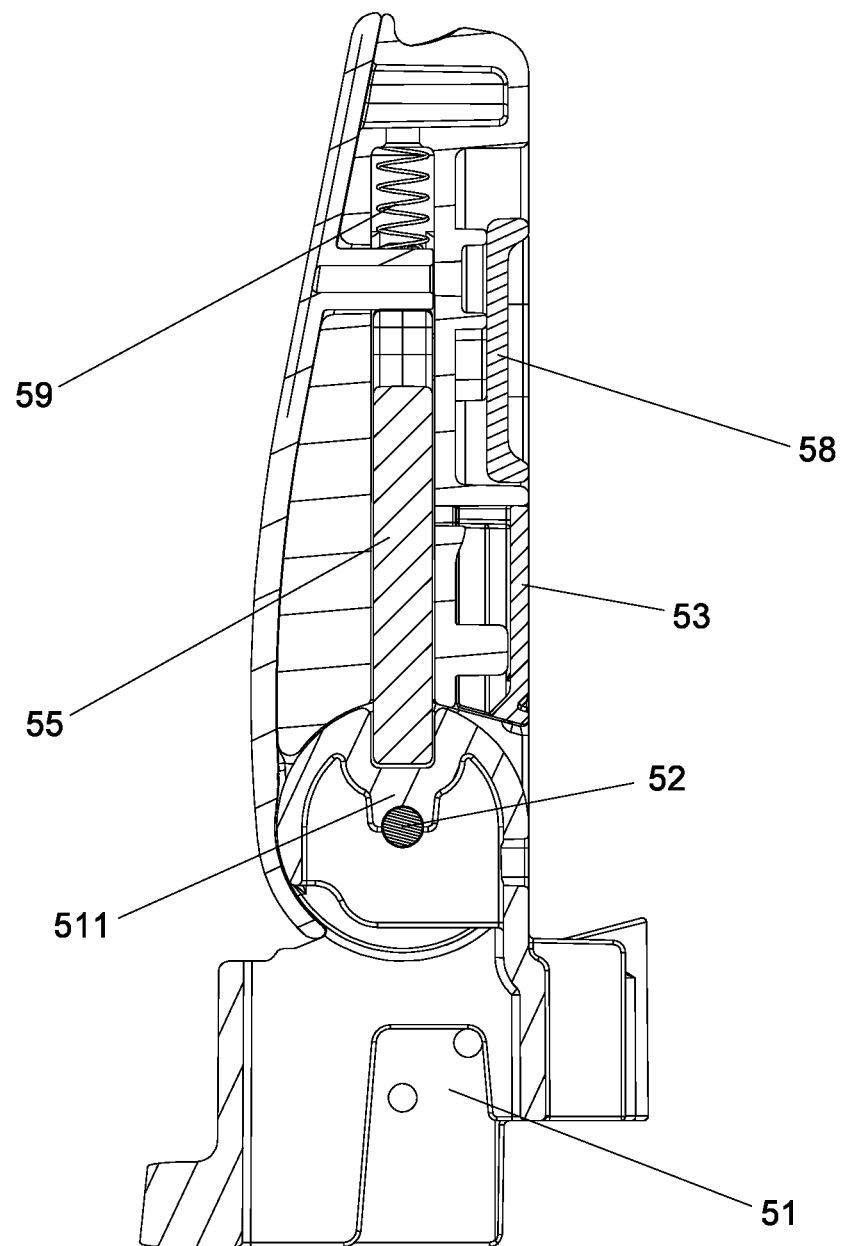
FIG. 13 is a cross-sectional view of the side impact protection mechanism shown in FIG. 12.

In addition to or alternative to the aforementioned structure for unlocking the buffering part 53, the latching mechanism provided in the buffering part 53 may include a release actuator 58. Referring to FIGS. 12-14, the release actuator 58 is connected with the latch 55, and is operable to urge the latch 55 to move from the locking state to the unlocking state. According to an example of construction, the release actuator 58 can be slidably locked with the latch 55. For example, the release actuator 58 can have one or more stud 581 that is respectively disposed through one or more guide slot provided in the buffering part 53 and is respectively engaged with one or more restricting opening 555 provided in the latch 55, whereby the release actuator 58 and the latch 55 can slide in unison relative to the buffering part 53 between the locking state and the unlocking state. For facilitating the placement of the release actuator 58, the buffering part 53 may have an opening 539, and the release actuator 58 may be received at least partially in the opening 539. For example, the release actuator 58 may include an oblong shape received in the opening 539. According to an example of construction, the release actuator 58 can be exposed and accessible for operation on an inner side of the buffering part 53 when the buffering part 53 is in the deployed position, and can be concealed in the opening 33 of the sidewall 31 when the buffering part 53 is in the stowed position.

Exemplary operation of the side impact protection mechanism 50 is described hereinafter with reference to FIGS. 1-14. When the child safety seat 100 is unused and has no child placed thereon, the buffering part 53 at each of the left and right sides of the seat shell 102 can be disposed in the stowed position in the opening 33 for convenient storage. The buffering part 53 may be kept in the stowed position by the biasing force of the spring 57.

When the buffering part 53 is to be used, a caregiver can grasp and rotate the buffering part 53 against the biasing force of the spring 57 from the stowed position toward the deployed position. As the buffering part 53 rotates relative to the seat shell 102 and the mount base 51, the latch 55 moves along with the buffering part 53 and is in sliding contact with an outer surface of the pivot support portion 511 owing to the biasing force of the spring 59. When the buffering part 53 reaches the deployed position, the latch 55 can engage with the locking slot 5111 under the biasing force of the spring 59 and thereby lock the buffering part 53 in position.

For stowing the buffering part 53, the caregiver may directly rotate the buffering part 53 an angle from the deployed position toward the stowed position, which can result in the latch 55 disengaging from the pivot support portion 511 of the mount base 51 owing to the sliding contact between the bevels 551 and 533. Alternatively, the caregiver may operate the release actuator 58 to disengage the latch 55 and unlock the buffering part 53. Under the biasing force of the spring 57, the unlocked buffering part 53 then can rotate to the stowed position for compact storage.

Advantages of the child safety seat described herein include a side impact protection mechanism that is simple in construction and can be stowed and deployed in a convenient manner.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
    a seat shell having a sidewall for restricting a sideways movement of a child sitting on the seat shell, the sidewall being provided with a locking slot;
    a buffering part movably connected with the seat shell, the buffering part being movable between a stowed position where the buffering part is retracted toward the sidewall, and a deployed position where the buffering part protrudes sideways from the sidewall; and
    a latching mechanism including a latch carried with the buffering part, the latch being movable relative to the buffering part between a locking state where the latch is engaged with the locking slot for locking the buffering part to the seat shell and an unlocking state where the latch is disengaged from the locking slot for unlocking the buffering part so that the buffering part is movable relative to the seat shell;
    wherein the seat shell has a mount base that protrudes inside an opening provided in the sidewall and has a convex surface on which the locking slot is provided, and the buffering part is pivotally connected with the mount base.

2. The child safety seat according to claim 1, wherein the buffering part is at least partially received in the opening in the stowed position.

3. The child safety seat according to claim 1, wherein the mount base has a pivot support portion, and the buffering part is rotatable around the pivot support portion.

4. The child safety seat according to claim 3, wherein the pivot support portion is at least partially cylindrical in shape.

5. The child safety seat according to claim 3, wherein the buffering part is pivotally connected with the mount base about a pivot axle that is disposed through a hole provided in the pivot support portion.

6. The child safety seat according to claim 1, wherein the buffering part is pivotally connected with the seat shell about a pivot axis, and the latch is slidable substantially orthogonal to the pivot axis.

7. The child safety seat according to claim 1, wherein the buffering part protrudes substantially perpendicular to the sidewall in the deployed position.

8. A child safety seat comprising:
    a seat shell having a sidewall for restricting a sideways movement of a child sitting on the seat shell, the sidewall having an opening, and a mount base disposed inside the opening;
    a buffering part pivotally connected with the mount base, the buffering part being rotatable between a stowed position where the buffering part is retracted toward the sidewall, and a deployed position where the buffering part protrudes sideways from the sidewall; and
    a latching mechanism including a latch carried with the buffering part, the latch being movable relative to the buffering part between a locking state for locking the buffering part to the seat shell and an unlocking state for unlocking the buffering part so that the buffering part is rotatable relative to the seat shell;

wherein the mount base has a convex surface on which a locking slot is provided, the latch being engaged with the locking slot in the locking state and disengaged from the locking slot in the unlocking state.

9. The child safety seat according to claim 8, wherein the mount base protrudes from a bottom of the opening.

10. The child safety seat according to claim 8, wherein the mount base has a pivot support portion, and the buffering part is rotatable around the pivot support portion.

11. The child safety seat according to claim 10, wherein the pivot support portion is at least partially cylindrical in shape.

12. The child safety seat according to claim 10, wherein the buffering part is pivotally connected with the mount base about a pivot axle that is disposed through a hole provided in the pivot support portion.

13. The child safety seat according to claim 10, wherein the buffering part has two sidewalls that face each other across a cavity, the buffering part being mounted to the mount base with the pivot support portion at least partially received in the cavity of the buffering part.

14. The child safety seat according to claim 8, wherein the buffering part is pivotally connected with the mount base about a pivot axis, and the latch is slidable substantially orthogonal to the pivot axis.

15. The child safety seat according to claim 8, wherein the buffering part protrudes substantially perpendicular to the sidewall in the deployed position.

16. The child safety seat according to claim 8, wherein the latching mechanism further includes a release actuator that is connected with the latch and is operable to urge the latch to move from the locking state to the unlocking state.

17. The child safety seat according to claim 16, wherein the release actuator is concealed in the opening when the buffering part is in the stowed position.

18. A side impact protection mechanism for a child safety seat, comprising:
    a mount base fixedly connected with a seat shell of the child safety seat;
    a buffering part pivotally connected with the mount base; and
    a latch carried with the buffering part and having an end adapted to engage with a locking slot provided on a convex surface of the mount base, the latch being movable relative to the buffering part to engage with the locking slot for locking the buffering part to the seat shell and disengage from the locking slot for rotation of the buffering part relative to the seat shell.

19. The side impact protection mechanism according to claim 18, wherein the buffering part is pivotally connected with the seat shell about a pivot axis, and the latch is movable toward the pivot axis to engage with the locking slot.

20. The side impact protection mechanism according to claim 18, further comprising a release actuator connected with the latch, the release actuator being operable to urge the latch to disengage from the locking slot.

21. The side impact protection mechanism according to claim 20, wherein the buffering part has a first end pivotally connected with the seat shell, and a second end opposite to the first end, the release actuator being disposed between the first end and the second end of the buffering part.

22. The side impact protection mechanism according to claim 18, further comprising a spring connected with the latch, the spring being operable to bias the latch for engagement with the locking slot.

\* \* \* \* \*